United States Patent [19]

Salomatin

[11] 4,269,228
[45] May 26, 1981

[54] DEVICE FOR CONTROLLING HYDRAULIC MOTORS

[76] Inventor: Viktor M. Salomatin, Kastanaevskaya ulitsa, 44, kv. 58, Moscow, U.S.S.R.

[21] Appl. No.: 954,211

[22] Filed: Oct. 24, 1978

[51] Int. Cl.³ .................. F16K 11/18; G05G 9/00
[52] U.S. Cl. .................. 137/636; 137/636.3; 137/636.4; 74/471 XY
[58] Field of Search .................. 91/521, 522; 137/636, 137/636.3, 636.4; 74/471 XY

[56] References Cited

U.S. PATENT DOCUMENTS

| | | | |
|---|---|---|---|
| Re. 274,488 | 9/1972 | Lauck | 91/521 |
| 2,313,438 | 3/1943 | Hoelscher | 137/636 |
| 2,331,790 | 10/1943 | Nichols, Jr. | 137/636 |
| 3,131,574 | 5/1964 | Clingerman | 137/636 |
| 3,472,282 | 10/1969 | Page et al. | 137/636 |
| 3,596,679 | 8/1971 | Snuyden, Jr. | 137/636 |
| 3,605,814 | 9/1971 | Gordon | 137/636 |
| 3,939,757 | 2/1976 | Jablonsky | 137/636 |

Primary Examiner—Martin P. Schwadron
Assistant Examiner—A. Michael Chambers
Attorney, Agent, or Firm—Haseltine and Lake

[57] ABSTRACT

The present invention is directed to mechanical handling machinery and equipment or load handling devices (manipulators).

The device of the invention comprises a housing accommodating a number of distributors made as spring-opposed directional control spool valves movable from an actuating member. One group of the control spool valves forms an angle with the longitudinal axis of the actuating member, while the other group has one arranged coaxially with the longitudinal axis of the actuating member, and the other valve is situated lengthwise of the axis.

The actuating member has two articulately interconnected levers of which one is provided with a knob and a ring for cooperation with one of the control spool valves in the first group of the directional control spool valves. The other lever is locked-in with the control spool valve arranged coaxially therewith and is provided with a pinion which is kinematically associated with the other control spool valve in the first group of the directional control spool valves.

In order to impart motion to the control spool valve arranged lengthwise the longitudinal axis of the actuating member, provision is made in the housing for an additional pinion to interact with the gear racks with which the control spool valves of the second group of the directional control spool valves are provided.

1 Claim, 3 Drawing Figures

DEVICE FOR CONTROLLING HYDRAULIC MOTORS

BACKGROUND OF INVENTION

This invention relates to control and regulation devices for hydraulic motors of diverse machinery for use in mechanical handling machinery and equipment, load handling devices (manipulators), or other similar items.

Diverse ways of controlling the load manipulators can be analyzed using as examples, control over loading manipulators intended to obey and execute the operator's commands.

At the present time, load manipulators featuring individual control of the drives are commonly used, wherein each of the drives (hydraulic motors) has a control lever of its own.

However, in the prior art, independently controlled load manipulators are materially disadvantageous in that the operator must effect control over individual operative units (such as the boom or pillar of a load-lifting crane) in succession, and but in extremely rare cases can he control two drives at a time.

The number of control levers in some machines are as large as ten and requires a high level of professional skill on the part of the operator and thus becomes a hindrance to an intense and continuous technological process. Control over such load manipulators gets much more difficult and complicated in cases where they have to operate indoors or in enclosed compartments, where working speed of the manipulator (the operative units) must be limited for the sake of safety operation.

In order to attain higher productive efficiency of the manipulator, use is made of a tracer control method, wherein the control mechanism is similar to the actuating or slave mechanism both geometrically and kinematically. However, inherent in the slave-type manipulators are the following disadvantages: the control mechanism lever must be shifted over a rather long distance; a low accuracy of load positioning is present with a large tracing scale; the operator's hand becomes irritated.

The above disadvantages of the slave-type manipulators can be obviated in the case of the floating (or non-corresponding) control, whereby the manipulator operating member adjusts the traversing speeds of the elements of the operative units proportionate with the travelling of the control mechanism elements. This method is capable of high-accuracy and control over the macromotions of the manipulator operating member by virtue of micromotions performed by the control mechanism elements and hence by the operator's hand, whereby physical effort applied by the latter is much reduced.

The floating-control manipulators, however, suffer from an oversophisticated control design and a lag of control signal, which signal passes through three control circuits, viz., setting member (rectilinear manipulator) - analogue-control mechanism - actuating (or slaving) mechanism.

To simplify control of industrial loading manipulators use is made of a cable drive of control signals to the servo actuator so that the signal from the control device and the feedback signal responding to each setting coordinate are transmitted to servospools of the hydraulic actuator through a cable drive. This arrangement is low in cost and involves no complicated or critically short elements and is operable practically under any type of working conditions.

However, the cable drive control system suffers from the disadvantages that, simultaneous control over different manipulator members is not possible until use is made of an improved design in the slave manipulators, where the feel of the operator's touch need be light. On the other hand, an integrated control over a few members or spool valves and hydraulic motors in different combinations from the same control member (level) is left beyond practical realization due to a sophisticated and cumbersome system of kinematic linking of cables, sheaves and control spool valves with the control lever.

Heretofore known control devices of a boring winch (cf., e.g., USSR Inventor's Certificate No. 176,377 and which are somewhat similar in construction to the present invention were built with articulated rods or links adapted to cooperate with a two-way control valve for the slow- and rapid-run coupling.

Some diverse control devices for hydraulic operative units are now in common use. Thus, for instance, the control lever (cf., e.g., USSR Inventor's Certificate No. 289,051 class B66C 13/18 of 1971) of an excavator or crane mechanism is known to comprise a lever and a rocker arm, both interacting with the control system spool valves. Such structure is somewhat similar to U.S. Pat. No. 3,605,814. For the sake of better operating conditions of the excavator or crane, as for opening the bucket bottom or manipulating the crane winch, the structure employs a microswitch built into the control lever.

Also known is a control system (cf., e.g., French Patent No. 2,271,479 class F15b 13/02) having a directional control valve for hydraulic power units having a control lever, which can be manually shifted to any of the four positions, of which two are indexed ones, and the lever is self-returned into the initial position from the two other positions.

The devices and systems discussed hereinbefore fail to adequately consider operation in, mechanical handling and erecting machinery and equipment, or manipulators provided with three hydraulic motors (with reversal) for rectilinear motion along the three coordinates, i.e., horizontal, vertical and swivel motions controlled by the operator, nor can they provide or reproduce a great diversity of motions which a human hand is able to perform.

The above said disadvantages are partly compensated for in hydraulic directional control valves employed at present in domestic road vehicle machines. Heretofore known hydraulic directional control valves are in fact devices for control and regulation of a few, in particular, of three hydraulic motors at a time, and are adapted for directional control (distribution) of the flow of power fluid in the hydraulic systems of tractors, road vehicles and some other machinery.

The directional control valve incorporates three spools which are kinematically independent of one another. Each of these controls an individual hydraulic motor of its own. All the three control spools are enclosed in a common housing and arranged in parallel to one another. Each of the spools has its own lever with a control knob, the lever being articulately interconnected with the spool. The levers make up an angle with axis of the spools and they swivel on a shaft in the housing and are provided with articulated joints made as spherical rings, each of which is adapted to interact with an individual spool. Through a rotational shaft in their middle portion, the levers are connected to the housing. The valve spools have three main positions, i.e., neutral (or crossover), lifting, and lowering.

The valve spools are of the closed crossover type. When in the neutral position, the valve spools are spring-balanced, the working fluid being admitted but not passed into the hydraulic cylinder chambers. The corresponding control knobs are provided for lifting, lowering and intermediate regulation. A substantial disadvantage of such a directional control valve resides in the fact that three control knobs are to be used to control the three respective actuators. It is thus practically impossible for one operator to shift three control knobs in parallel at a time with an adequate accuracy, which complicates the control process and adversely affects the speed of shifting.

One of the most important practical findings of ergonomics for manually operated controls is that whenever accurate and speedy control is required, it is best to utilize a control member actuated by one hand for rapid traversing and changing over any mechanisms.

The shifting of the control knobs in the aforesaid directional control valve, fails to coincide with the direction of motion of the operative units, in particular, with that of the crane boom luffing and its slewing round the crane pillar.

Such a concordance of movements is especially indispensable when control over a load handling machinery in enclosed compartments or premises, is required and where the location of the load to be handled changes both during gripping the load and when positioning the latter.

SUMMARY OF THE INVENTION

It is an object of the present invention to simplify the control of the device having at least three hydraulic motors, for traversing the operative unit along three coordinates.

It is another object of the present invention to attain more rapid control of the hydraulic motors due to a possibility of simultaneously changing the position of at least three directional control spool valves in any combination thereof, from a single control knob.

It is one more object of the present invention to attain higher maneuverability of the hydraulic motors under control, such that actuate load-lifting cranes and manipulators in cumbersome and crowded conditions of enclosed compartments or premises is possible.

These and other objects are accomplished due to the fact that in a device for controlling hydraulic motors, comprises a housing accommodating hydraulic distributors made as spring-opposed directional control valves, of which two are provided with gear racks, a slidable actuating member for said spool valves, said member being capable of rocking motion. According the invention, two spool valves, a first and a second have gear racks arranged in the housing in a lengthwise direction with the longitudinal axis of the actuating member and respectively coaxial and substantial in parallelism with the axis. At least two other spool valves, a third and a fourth, form an angle with the longitudinal axis of the actuating member and is formed of two articulately interconnected levers mounted in the housing, reciprocatingly and rotatably round their own longitudinal axis; one of the levers has a knob and a ring adapted for interacting with the third spool valve, whereas the other lever is locked-in with the first spool valve and is provided with a pinion kinematically associated with the fourth spool valve. Another pinion is accommodated in the housing and is adapted to interact with the gear racks to impart motion to the second spool valve.

The proposed construction of the device enables one to greatly simplify the control of at least three hydraulic motors in any combination of operation thereof, using a single control knob, in order to traverse the operative units along the three and more coordinates. This is attained due to the provision of kinematic linkages between the actuating member and the spool valves and further due to their appropriate mutual arrangement.

The device of the present invention fully meets the up-to-date requirements imposed by ergonomics. Furthermore, it is operable by low-skilled operators due to its being a simple and it is therefore possible to efficiently utilize the operator's working time due by dispensing with odd and unreasonable motions which occur in the case of an independent control of hydraulic motors (which is the case with the known manipulators).

The device is applicable for both direct control of hydraulic motors and for use as a control member of, a spool-valve hydraulic booster or servounit.

The device is free from any disadvantages inherent in the slave-type manipulators, such as a necessity for the operator to shift the control mechanism knob over rather long distance, too low a load positioning accuracy in the case of large-scale slaving, and undue exertion on the part of the operator's hands.

Nor is the device subject to any drawbacks as to overcomplicated control scheme, which incorporates three control circuits (setting member or rectilinear manipulator - analogue-control mechanism - actuating or slaving mechanism), where a great lag of control signal passing to the operative unit takes place.

It is believed that other objects and advantageous features of the present invention will be clearly understood from the following detailed description and the drawings annexed thereto, wherein:

BRIEF DESCRIPTION OF THE INVENTION

DESCRIPTION OF THE INVENTION

Figures 1, 2:
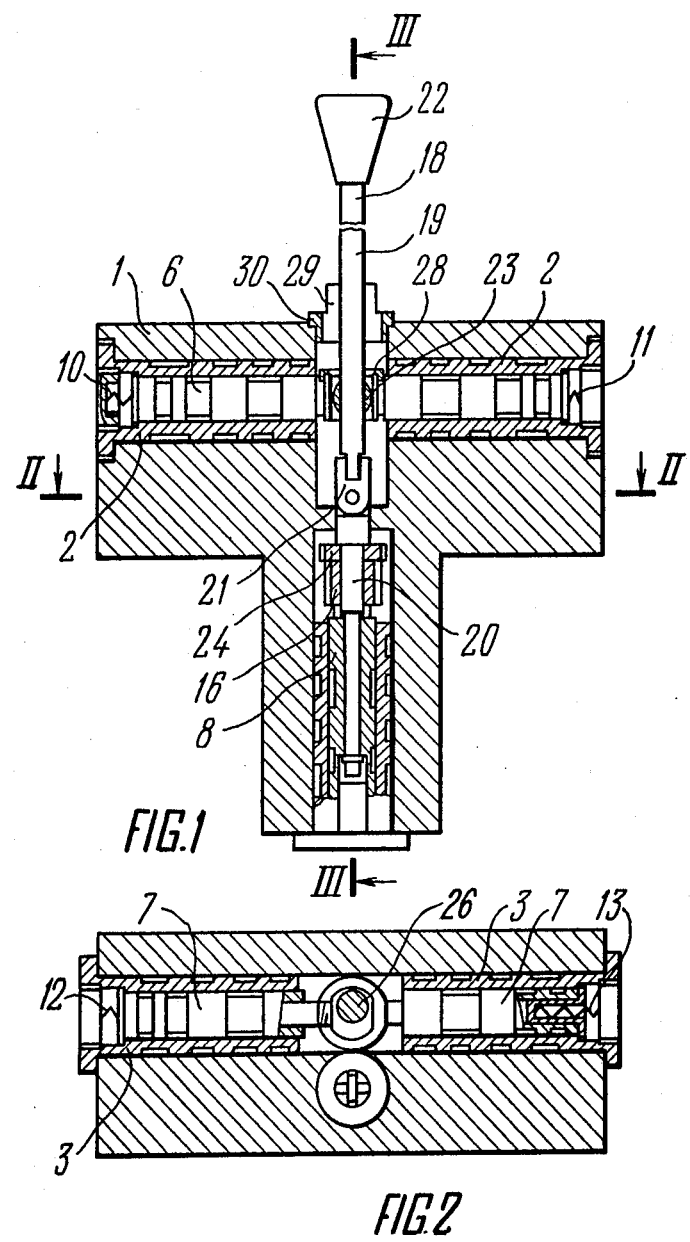
FIG. 1 is a general longitudinal section view of the device, according to the invention.
FIG. 2 is a section taken along the line II—II in FIG. 1.
Figure 3:
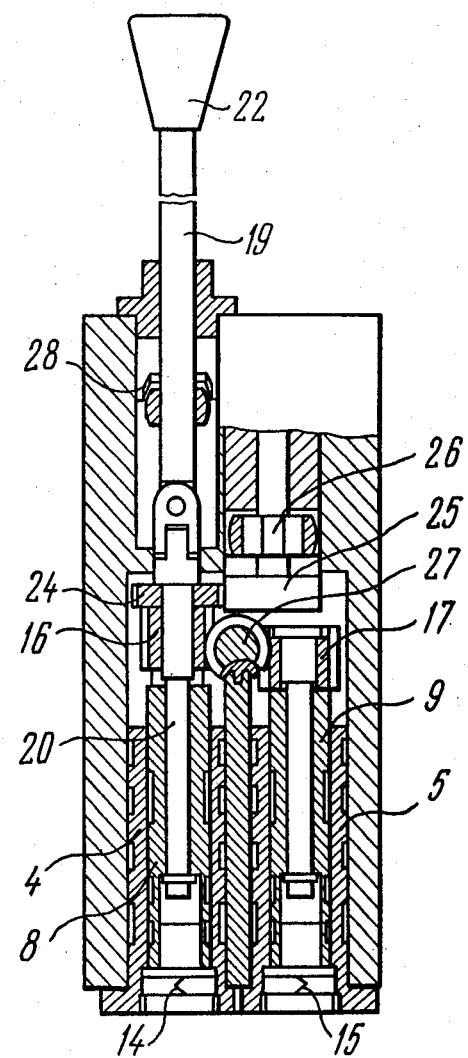
FIG. 3 is a section taken along line III—III in FIG. 1.

Reference being now directed to the accompanying drawings, the device for controlling hydraulic motors (FIG. 1) comprises a housing 1, directional control sleeves 2 (FIG. 2) and 3, 4, 5 (FIG. 3) of spool valves 6, 7, 8, 9, which are opposed by springs 10, 11, 12 and 13, 14 and 15. The spool valves 8 and 9 are provided with gear racks 16 and 17. An actuating member 18 is accommodated in the housing 1 with a possibility of rocking. The spool valves 6 and 7 form the right angles with the longitudinal axis of the actuating member 18. The spool valve 8 is coaxial and the spool valve 9 is parallel with the axis of the actuating member 18.

The actuating member 18 is made up by two levers 19, 20 interlinked through an articulated joint 21. Both of the levers 19 and 20 are mounted reciprocatingly and rotatably around their own longitudinal axis.

The lever 19 has a knob 22 and a ring 23 which is adapted to interact with the spool valve 6 when the lever 19 performs rocking motion. The lever 20 is locked-in with the spool valve 8 and has a pinion 24 which is kinematically associated with the spool valve 7. The kinematic linkage is effected through a pinion 25 and an eccenter shaft 26. An additional pinion 27 is accommodated in the housing 1, and is adapted to interact with the gear racks 16 and 17 of the spool valves 8 and 9 when the levers 19 and 20 reciprocate. The ring 23 of the lever 19 is located in the middle portion of the spool valve 6, both halves of which communicate through a sleeve 28. The lever 19 with the knob 22 is capable of rocking with respect to the articulated joint 21 while sliding along a slot 29 of a sleeve 30.

The spool valves 6, 7, 8 and 9 are mounted respectively in directional control sleeves 2, 3, 4, and 5 with a possibility of reciprocatingly sliding along their own longitudinal axes, whereas, the spool valve 8 is rotatable, around its own axis.

The device of the invention operates as follows. Upon shifting the knob 22 of the lever 19 to the left or right along the slot 29 of the sleeve 30, the spool valve 6 is displaced from its neutral position, thus admitting the working fluid to pass to the operative unit (not shown) which actuates, say, the luffing of the crane boom of a mechanical load handling machine.

Upon shifting the knob 22 down or up, the levers 19 and 20 are moved respectively, and the spool valve 8 locked-in with the lever 20 is also displaced along with the gear rack 16. Next, motion is imparted via the gear rack 16, the additional pinion 27 and the gear rack 17 to the spool valve 9. As soon as the spool valves are displaced from their neutral position, the working fluid is free to pass to the operative unit (not shown) which actuates the pillar of a mechanical load handling machine. Upon rotation of the levers 19, 20 through the knob 22, rotation is transmitted to the pinion 24 engaged by meshing with pinion 25 which is linked with the eccentrically mounted shaft 26; this in turn rotates to actuate the spool valve 7. The spool valve is displaced from the neutral position and admits the working fluid to pass to the operative unit which causes slewing of a mechanical load handling machine around its own axis. When several valves must be turned in at a time, the motions of the knob 22 are combined to give the most diverse combinations of spool valve sliding.

From all its intermediate positions, the actuating member 18 is self-returned into the initial position corresponding to the neutral position of the spring-opposed spool valves 6, 7, 8, 9, at the same time stopping the operative units of the mechanism which adds to the safety and reliability of operation.

What we claim is:

1. A device for controlling hydraulic motors, comprising: a housing; a plurality of distributors disposed in said housing, said distributors being substantially formed as spring-opposed hydraulic directional control spool valves; an actuating member means to shift said spool valves; said actuating member means being disposed in said housing and defined by two articulately interlinked levers pivotal with respect to each other, reciprocatingly mounted and rotatably disposed around their own longitudinal axis; said control spool valves including first and second spool valves, said first and second spool valves respectively provided with gear racks, one of said racks attached to said first spool valve and including a pinion disposed between said racks and one of said spool valves arranged coaxially while the other spool valve is substantially in parallelism with the longitudinal axis of said levers; reciprocation of said levers reciprocating said first and second spool valves relative to said housing at least two other spool valves referred to as the third and fourth spool valves, said third and fourth spool valves being disposed at an angle with the longitudinal axis of said levers; one of said levers being provided with a knob and a ring which is adapted to interact with said third spool valve to reciprocate said third spool valve when said levers are pivoted with respect to each other, whereas, the other lever is connected to said first spool valve and has a pinion associated therewith, said pinion including eccentrically mounted shaft means connected with said fourth spool valve such that rotation of said levers reciprocates said fourth spool valve.

* * * * *